United States Patent [19]

Lundblad

[11] Patent Number: 5,355,655
[45] Date of Patent: Oct. 18, 1994

[54] SYSTEM WHICH INCLUDES APPARATUS FOR TRANSMITTING MESSAGES TO RECEIVING APPARATUS

[76] Inventor: Leif Lundblad, Djurgårdsslätten 100, S-115 21 Stockholm, Sweden

[21] Appl. No.: 927,503
[22] PCT Filed: Mar. 12, 1991
[86] PCT No.: PCT/SE91/00184
  § 371 Date: Oct. 29, 1992
  § 102(e) Date: Oct. 29, 1992
[87] PCT Pub. No.: WO91/14335
  PCT Pub. Date: Sep. 19, 1991

[30] Foreign Application Priority Data

Mar. 12, 1990 [SE] Sweden ............... 90008681

[51] Int. Cl.$^5$ .................. B65B 11/50; B65B 61/00
[52] U.S. Cl. ................... 53/131.4; 53/131.2; 53/553
[58] Field of Search ........... 53/131.2, 131.4, 553, 53/554, 555; 178/37; 380/16, 18, 23

[56] References Cited

U.S. PATENT DOCUMENTS

| | | |
|---|---|---|
| 3,439,469 | 4/1969 | Van Mil, Jr. . |
| 3,465,492 | 9/1969 | Jensen . |
| 3,849,968 | 11/1974 | Tateisi . |
| 3,973,373 | 8/1976 | Williams, Sr. et al. . |
| 4,202,150 | 5/1980 | Petersson . |
| 4,701,233 | 10/1987 | Beck et al. . |
| 5,031,379 | 7/1991 | Lundblad et al. . |

FOREIGN PATENT DOCUMENTS

| | | |
|---|---|---|
| 378912 | 7/1990 | European Pat. Off. . |
| 406198 | 1/1991 | European Pat. Off. . |
| 3439535 | 4/1986 | Fed. Rep. of Germany . |
| 58-215864 | 12/1983 | Japan . |
| 61-145965 | 7/1986 | Japan . |
| WO8602799 | 5/1986 | PCT Int'l Appl. . |
| WO8605344 | 9/1986 | PCT Int'l Appl. . |
| WO9010349 | 9/1990 | PCT Int'l Appl. . |

*Primary Examiner*—Linda B. Johnson
*Attorney, Agent, or Firm*—Simmons, Perrine, Albright & Ellwood

[57] ABSTRACT

A system comprising transmitting apparatus for transmitting messages to receiving apparatus which have a closed casing for collecting printed sheets into a bundle and also enclosing enveloping material for automatically enveloping the collected bundles of printed sheets. Receiving apparatus (M1, M2, ... Mn), each having a closed casing (h1, h2, ... hn) and enveloping material (F1) in said casing, and are intended for installation at stations (UP1, UP2, UPn) intended for the central collection of enveloped bundles or dispatches (FF1) addressed to addressees located in the neighborhood of respective collecting stations. The transmitting apparatus (S1, S2, ... Sm) are equipped with payment means (b1, b2, bm) through which payment can be made for a transmission service on each transmission occasion, this service including transmission of a message, enveloping the message received and delivering the message or dispatch to the receiving addressee.

6 Claims, 1 Drawing Sheet

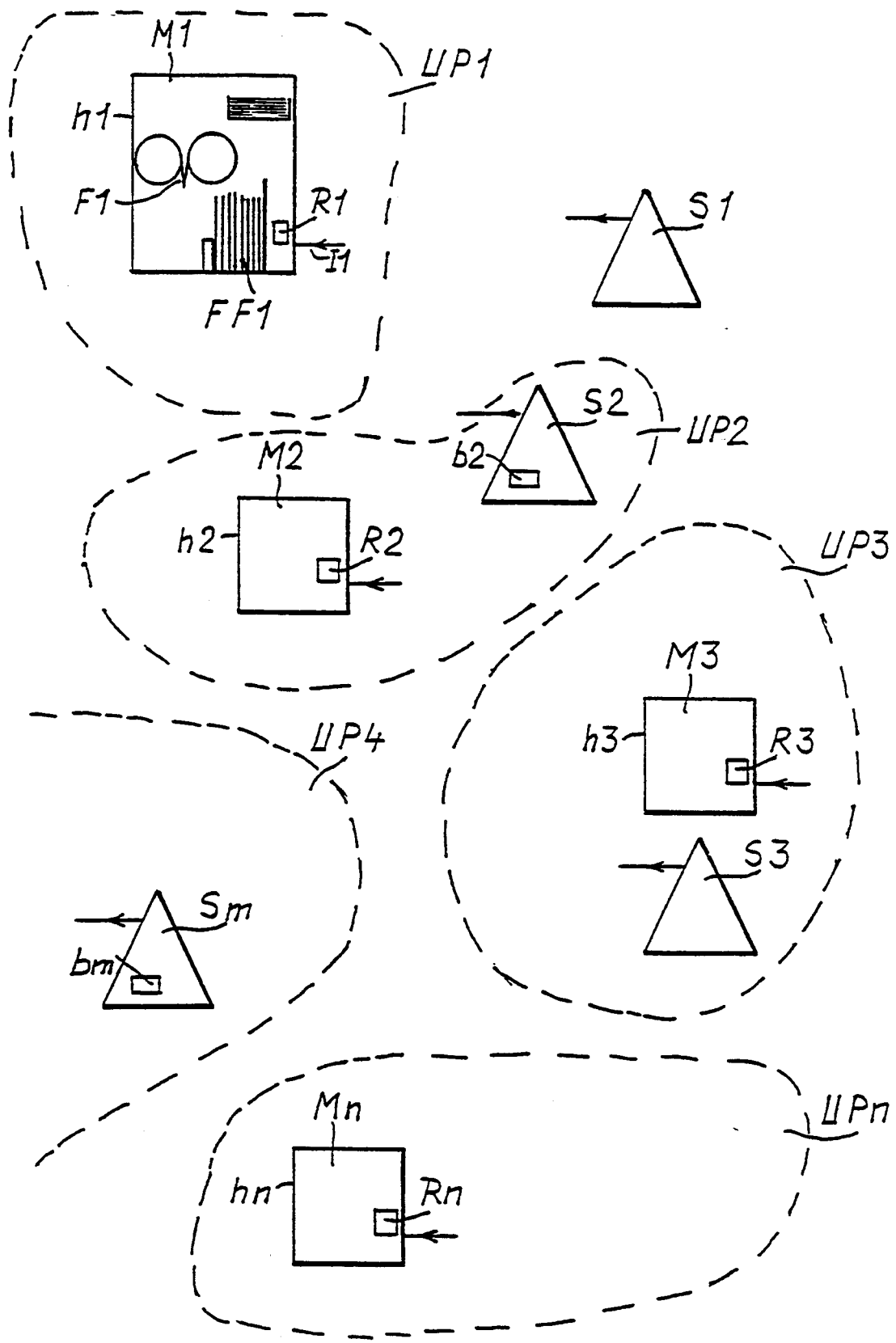

SYSTEM WHICH INCLUDES APPARATUS FOR TRANSMITTING MESSAGES TO RECEIVING APPARATUS

TECHNICAL FIELD

The present invention relates to a system which comprises apparatus for transmitting messages to receiving apparatus. More specifically, the invention relates to such a system in which the receiving apparatus have a closed casing for collecting printed sheets into a bundle and in which casing enveloping material is available for automatically enveloping the collected bundle of printed sheets containing a printed message.

BACKGROUND ART

It is known to transmit messages from one location to another with the aid of teletechnical auxiliaries, by passing a printed sheet and/or a picture through an apparatus in the first mentioned location and transmitting the information content of the sheet (text, picture) teletechnically to a corresponding, synchronously operating apparatus in the latter location, where the information content is reproduced (printed) on similar sheets. Systems of this kind are referred to as telefacsimile systems in present-day parlance.

In principle, telefacsimile systems can be in operation day and night with on one in continuous attendance, and consequently larger or smaller number of message-containing sheets may collect in the receiving apparatus, it being necessary at a later stage to sort these sheets and deliver them to respective addressees.

In order to avoid uncontrolled distribution of the aforesaid transmitted, printed messages, the receiving apparatus may be provided with a closed casing in which the printed sheets collected in the casing are bundled and in which enveloping material is available for automatically enveloping the thus bundled sheets. By bundling and enveloping each message received by the receiving apparatus, there is obtained in the casing a number of mutually separate dispatches which are immediately ready for dispatch to respective addressees (without needing to be sorted or addressed).

A further development of the aforedescribed system enables persons who have no personal telefacsimile machine to transmit and receive messages, simply and quickly, through central telefacsimile systems, normally a telefacsimile service offered by the general post office or telegraph office. Naturally, persons who have their own telefacsimile system may also be connected to these newer telefacsimile systems and benefit from the higher degree of security (secrecy) that these systems automatically provide.

The characteristic features of one such further development telefacsimile systems are set forth in the following claims.

DISCLOSURE OF THE INVENTION

The inventive system includes a plurality of receiving apparatus, each including a closed casing in which enveloping material is available. These apparatus are intended to be installed at locations or stations intended for the central collection of enveloped dispatches addressed to addressees in the neighbourhoods of respective collecting stations.

The system also includes a plurality of transmitting apparatus, of which at least some are equipped with payment means which enable payment to be made for the service provided on each transmission occasion, said service including transmission of a message to a selected receiving apparatus, enveloping the message received and printed by the selected apparatus and also the delivery of the printed and enveloped message to the receiving addressee located in the neighbourhood of the selected receiving apparatus.

In order to enable the system to be used by persons who have their own (private) telefacsimile system but who, however, lack payment means of the aforesaid kind, the receiving apparatus are equipped with recording means which record register information concerning the telefacsimile system in questions and the messages transmitted to selected receiving apparatus. This information is later used as the basis on which the transmitted and distributed messages are paid for.

The invention will now be described with reference to an inventive system which comprises a plurality of transmitting and receiving apparatus installed at a plurality of central collecting stations.

BRIEF DESCRIPTION OF THE DRAWING

The invention will now be described with reference to an exemplifying embodiment thereof illustrated in the accompanying drawing, the single FIGURE of which illustrates very schematically an inventive system of message transmitting and message receiving apparatus.

BEST MODE OF CARRYING OUT THE INVENTION

The system illustrated in the drawing includes a plurality of telefacsimile-type receiving apparatus M1, M2, M3, Mn, each of which includes a closed casing h1, h2, h3, hn which houses enveloping material F1. These apparatus are intended to be installed at stations intended for the central collection of enveloped messages FF1 addressed to addressees located in the neighbourhood of respective collecting stations.

The system also includes a plurality of telefacsimile-type transmitting apparatus S1, S2, S3, Sm, of which some, namely S2 and Sm, are equipped with payment means b2, bm through which payment can be made for the services used on the transmitting occasion, this service including the trans mission of a message to a selected receiving apparatus, e.g. the apparatus M2, enveloping of the message received in and printed by the selected receiving apparatus M2, and delivery of the printed and enveloped message or dispatch to an address located within or close to the collecting station UP2 in which the receiving apparatus M2 is installed.

The illustrated system includes collecting station UP1 with receiving apparatus M1, collecting station UP2 with transmitting apparatus S2 and receiving apparatus M2, collecting station UP3 with transmitting apparatus S3 and receiving apparatus M3, transmitting station UP4 (shown only partially) with transmitting apparatus Sm, and collecting station UPn with receiving apparatus Mn. The system also includes a transmitting apparatus S1, which represents a private telefacsimile machine.

Although the illustrated collecting stations UP2 and UP3 include separate transmitting and receiving apparatus, it will be understood that said stations may be equipped with conventional apparatus designed for both transmitting and receiving purposes.

The receiving apparatus M1 is shown in slightly more detail than the remaining apparatus. Telefacsimile signals, which may possibly be encrypted in order to provide greater security, are sent to the apparatus on an input line I1. These signals, optionally after being decrypted, start-up the apparatus in a known manner, which in response thereto print the received messages on successively advanced paper sheets within the closed casing h1 of the apparatus. A paper storage facility is indicated in the right-hand top corner of the casing. If the information contained in one and the same message fills several sheets, the sheets are collected into a bundle and the bundle is enveloped with the enveloping material F1 provided in the casing, this enveloping material in the illustrated embodiment being stored on two mutually adjacent rolls. Subsequent to printing, bundling and enveloping an incoming message, said message is brought together with earlier processed messages FF1 within the casing h1, where they are inaccessible to unauthorized persons.

The manner in which such messages are printed, bundled and enveloped is described in more detail in European Published Application No. 0 406 198 and will not therefore be described in detail here. Neither will the actual telefacsimile procedure be described in this document, although it can be briefly stated that the entire function of the receiving apparatus is controlled teletechnically with the aid of signals transmitted in conjunction with the message transmission.

Each of the transmitting apparatus S2, Sm is equipped with a payment means b2, bm, through which payment for the service used at each transmission occasion can be paid, this service including the transmission of a message from, e.g., the apparatus S2 to the apparatus Mn, enveloping of the message received and printed by the apparatus Mn, and delivery of the printed and enveloped message to the relevant addressee, for instance a private individual who lives close to a post office or telegraph station in which the apparatus Mn is installed for the benefit of the general public.

According to the aforesaid, the various apparatus included in the inventive system are intended for use in post offices, bank facilities, large business offices and private companies which have large quantities of incoming and outgoing mail. In order to enable the system to be used also by private persons who possess their own telefacsimile system, the receiving apparatus M1, M2, M3, Mn of the inventive system are provided with separate recording means R1, R2, R3, Rn which function to record information concerning the transmitting apparatus (subscriber number), e.g. S1, which lacks its own payment means but which can, nevertheless, be constructed for transmitting messages to receiving apparatus, e.g. M1, and messages transmitted to receiving apparatus M1 (the number of printed and enveloped sheets in respect of a given message). This information later forms the basis for evaluating payment for transmitted and delivered messages, for instance on a quarterly basis.

One of the most noticeable advantages afforded by the inventive system is that when an apparatus has received a number of messages, a number of neat dispatches are obtained which can be immediately delivered to the various addressees by personnel authorized to make such deliveries. This obviates the need of sorting a larger or smaller number of printed sheets, which are often in a curled or semi-curled state, often necessary with conventional telefacsimile systems, and which are also unprotected and able to be read by unauthorized people. In order to enhance secrecy, even when the dispatches have been removed form the closed casing by authorized personnel, each of the receiving apparatus M1, M2, . . . Mn is designed to print a sheet with solely the name and address of the addressee, this sheet being intended to form the first page of the bundle and being the only sheet which is visible through the material which envelopes the bundled message, i.e. the dispatch. This can be achieved in a number of different ways, all of which can be effected with the aid of the electronics and program installed in the receiving apparatus and by controlling the procedures with the aid of signals from the transmitting apparatus. According to one such method, rasters of alphabetic letters (signs) are printed on the first page of each message, these letters or signs covering the whole of said page with the exception of a limited space reserved for the name and address of the addressee. According to another method, the receiving apparatus is programmed to insert a second page printed with a raster for protecting the text on the underlying sheet. (By raster is meant here a collection of alphabetic letters which together form an unintelligible alphabetic sequence.)

A person wishing to transmit a telefacsimile message from, for instance, a post office where access can be had to a system constructed in accordance with the invention will, for instance, proceed in the following manner.

The person is able, on the basis of available information, to calculate the cost of transmitting a given message to a given addressee (the length of the message in the number of A-4 pages entailed, the distance to the nearest collecting station in the vicinity of the addressee, etc.). The person concerned inserts the relevant sum (banknotes and/or coins) in the relevant slot or opening provided herefor in the payment means of the transmitting apparatus, for instance b2 in the apparatus S2, whereafter said person inserts the message (possibly several A-4 pages) in the place intended and inserts the routing number of the relevant collecting station, for instance UP1, on the apparatus keyboard. The apparatus will then automatically transmit the message to the receiving apparatus M1.

Alternatively, the transmitting apparatus S2 may be equipped with a card reader, therewith enabling the customer to pay with his/her credit card.

As described in the aforegoing, the message received in the receiving apparatus M1 is bundled and enveloped with only the addressee's name and address visible through the envelope. Authorized personnel empty the apparatus, sort the enveloped dispatches contained therein so that respective delivery personnel receive those dispatches which belong to their particular districts. The transmission/receiving procedure is therewith terminated.

Because of the speed at which it operates and the security (secrecy) which it affords, the inventive system finds many practical uses. One example is its use in a hospital complex. It is often very important (to doctors) or particularly desirable (to patients) that messages reach the addressee swiftly and surely. It is possible for the individual who possess his/her own telefacsimile machine, and for other interested individuals with the aid of apparatus installed, for instance, in post offices, to utilize the concepts of the present invention.

Although mention has been made several times in the aforegoing to a system in which transmission is effected in accordance with the telefacsimile technology, it will be understood that the invention is not restricted to just this form of technology but can be practiced equally as well in other systems, possibly novel systems, utilizing transmitting and receiving apparatus and with teletechnical transmission. Furthermore, many modifications are possible within the scope of the following Claims. For instance, instead of delivering dispatches through the conventional postal delivery service, the receiving apparatus may be installed in messenger or courier vehicles where the messages are received over a radio channel and printing, bundling and enveloping of the messages is effected in a known manner while the vehicles carries out its courier service. The driver of the vehicle will empty the apparatus casing of dispatches at regular intervals, or upon the occurrence of a signal during reception of a message, and then immediately deliver the message to the addressee concerned.

Other modifications are also conceivable, such as the configuration of the actual dispatch itself. When the enveloping material is perforated in its longitudinal direction, centrally between its outer edges, the envelope of each dispatch will be encircled by a continuous line of perforations, approximately in the centre line (symmetry line) of the dispatch. This facilitates opening of the dispatch by the addressee. The contents of the dispatch can be withdrawn neatly, by pulling on the two outer edges, without risk of damaging the dispatch (tearing the dispatch) when opening the envelope.

I claim:

1. A system comprising:
   a plurality of transmitting apparatuses having means for transmitting messages wherein one or more of said plurality of transmitting apparatuses include payment means for providing payment for use of said system and a remainder thereof do not include said payment means; and
   a plurality of receiving apparatuses having means for receiving and printing said messages on sheets contained within each of said plurality of receiving apparatuses; each of said plurality of receiving apparatuses having a closed casing having means for collecting said sheets containing each said printed message into a bundle; each of said plurality of receiving apparatuses including means for automatically enveloping said bundle in enveloping material contained therein;
   wherein each of said plurality of transmitting apparatuses includes means for transmitting said messages to a selected one of said plurality of receiving apparatuses.

2. The system according to claim 1, wherein each of said plurality of receiving apparatuses includes recording means for recording information concerning said messages received from said remainder of said plurality of transmitting apparatuses.

3. The system according to claim 1, wherein said enveloping material has a window for each of said messages, the system comprising each of said plurality of receiving apparatuses having printing means for printing a first one of said sheets of each said bundle with addressee information such that only the portion of said first one of said sheets containing said addressee information is visible through said window.

4. The system according to claim 3, wherein each of said plurality of receiving apparatuses includes means for covering the remainder of said first sheet, other than the portion containing said addressee information, with a raster of alphabetic letters printed in an unintelligible sequence.

5. The system according to claim 3, wherein each of said plurality of receiving apparatuses includes means for covering a last one of said sheets of each said bundle with a raster of alphabetic letters printed in an unintelligible sequence.

6. The system according to claim 2, wherein said enveloping material has a window for each of said messages, the system comprising each of said plurality of receiving apparatuses having means for printing a first one of said sheets of each said bundle with addressee information such that only the portion of said first one of said sheets containing said addressee information is visible through said window.

* * * * *